(12) United States Patent
Sivertsen

(10) Patent No.: US 8,886,407 B2
(45) Date of Patent: Nov. 11, 2014

(54) STEERING WHEEL INPUT DEVICE HAVING GESTURE RECOGNITION AND ANGLE COMPENSATION CAPABILITIES

(75) Inventor: Clas Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 341 days.

(21) Appl. No.: 13/188,975

(22) Filed: Jul. 22, 2011

(65) Prior Publication Data

US 2013/0024071 A1    Jan. 24, 2013

(51) Int. Cl.
*A01B 69/00* (2006.01)
*B60K 37/06* (2006.01)
*B60K 35/00* (2006.01)

(52) U.S. Cl.
CPC .............. *B60K 35/00* (2013.01); *B60K 37/06* (2013.01)
USPC .............................. 701/41; 715/863; 345/173

(58) Field of Classification Search
CPC ...... B60K 37/06; B62D 5/0463; B62D 7/159; B62D 6/008
USPC ....................... 701/36, 41; 715/863; 345/156, 345/173–178; 178/18.01, 18.03
See application file for complete search history.

(56) References Cited

U.S. PATENT DOCUMENTS

| | | | |
|---|---|---|---|
| 4,840,389 A | 6/1989 | Kawabe et al. | |
| 5,550,930 A | 8/1996 | Berman et al. | |
| 5,774,591 A * | 6/1998 | Black et al. | 382/236 |
| 6,839,050 B2 * | 1/2005 | Sakamaki et al. | 345/156 |
| 7,084,859 B1 * | 8/2006 | Pryor | 345/173 |
| 7,126,583 B1 * | 10/2006 | Breed | 345/158 |
| 7,289,645 B2 * | 10/2007 | Yamamoto et al. | 382/104 |
| 7,295,904 B2 * | 11/2007 | Kanevsky et al. | 701/36 |
| 7,605,693 B2 | 10/2009 | Kulas | |
| 7,607,087 B2 * | 10/2009 | Prados | 715/701 |
| 7,760,188 B2 * | 7/2010 | Yoshio et al. | 345/173 |
| 7,974,251 B2 | 7/2011 | Gercekci et al. | |
| 2002/0135163 A1 * | 9/2002 | Derrick | 280/731 |
| 2004/0122572 A1 * | 6/2004 | Ichinose | 701/36 |
| 2004/0254698 A1 | 12/2004 | Hubbard et al. | |
| 2005/0052426 A1 | 3/2005 | Hagermoser et al. | |
| 2006/0146037 A1 * | 7/2006 | Prados et al. | 345/173 |
| 2006/0262103 A1 * | 11/2006 | Hu et al. | 345/173 |
| 2007/0100523 A1 * | 5/2007 | Trachte | 701/41 |
| 2007/0120830 A1 | 5/2007 | Kämmerer | |

(Continued)

OTHER PUBLICATIONS

International Search Report dated Oct. 19, 2012 in PCT/US2012/047660.

*Primary Examiner* — Hanh V Tran
(74) *Attorney, Agent, or Firm* — Lee & Hayes PLLC

(57) ABSTRACT

A steering wheel input device is mounted on a vehicle steering wheel and includes a pointer detection device detecting a pointer event on a pointer detection surface, any movement or breaking of the pointer event, and the speed, velocity, and acceleration of the pointer event, and outputs a corresponding pointer detection signal. The steering wheel input device also includes a rotation angle sensor and a processor. The rotation angle sensor takes measurements related to an angle of rotation of the steering wheel and outputs a corresponding rotation detection signal. The processor determines the angle of rotation of the steering wheel using the rotation detection signal, determines which gesture that the pointer detection signal corresponds to using the pointer detection signal and the angle of rotation of the steering wheel, and outputs a command corresponding to the gesture. The command can serve as input to control vehicular systems.

22 Claims, 8 Drawing Sheets

(56) References Cited

U.S. PATENT DOCUMENTS

| | | | |
|---|---|---|---|
| 2007/0180718 A1* | 8/2007 | Fourquin et al. | 33/366.11 |
| 2008/0109132 A1* | 5/2008 | Yukawa et al. | 701/36 |
| 2008/0143686 A1* | 6/2008 | Yeh et al. | 345/173 |
| 2008/0228329 A1 | 9/2008 | Hartman | |
| 2009/0073112 A1* | 3/2009 | Basson et al. | 345/156 |
| 2009/0139778 A1* | 6/2009 | Butler et al. | 178/18.03 |
| 2009/0192677 A1* | 7/2009 | Cech et al. | 701/41 |
| 2009/0278915 A1* | 11/2009 | Kramer et al. | 348/48 |
| 2010/0268426 A1* | 10/2010 | Pathak et al. | 701/48 |
| 2010/0288567 A1* | 11/2010 | Bonne | 178/18.01 |
| 2010/0315376 A1* | 12/2010 | Choi | 345/175 |
| 2010/0321289 A1* | 12/2010 | Kim et al. | 345/156 |
| 2011/0030502 A1* | 2/2011 | Lathrop | 74/552 |
| 2011/0169750 A1* | 7/2011 | Pivonka et al. | 345/173 |
| 2012/0173079 A1 | 7/2012 | Oblizajek et al. | |

* cited by examiner

STEERING WHEEL INPUT DEVICE HAVING GESTURE RECOGNITION AND ANGLE COMPENSATION CAPABILITIES

TECHNICAL FIELD

The present disclosure is related to an input device that is mounted on a steering wheel of a vehicle that has gesture recognition capabilities and that compensates for changes in the steering wheel angle.

BACKGROUND

Audio system controls are included on the steering wheels of many vehicles. Drivers quickly learn the positioning of these controls so that they can be operated while driving without looking at them. This allows the controls can be operated comfortably and safely. Many other controls are now provided on steering wheels. For example, various push buttons, switches, scroll buttons, etc. for on-board computer functions, navigation functions, climate control, entertainment system functions, and other functions commonly appear on the steering wheels of many vehicles.

However, when the steering wheel is rotated, it becomes difficult, and in some cases impossible, to operate the controls without looking at the steering wheel. This is particularly the case when the rotation of the steering wheel angle is large. Oftentimes, drivers are forced to wait until the steering wheel is returned to the center position before operating the controls. Alternatively, the driver may be distracted by operating the control when the steering wheel is at an angle.

It is with respect to these considerations and others that the various embodiments described herein have been made.

SUMMARY

In accordance with the embodiments presented herein, the above and other considerations are addressed by a steering wheel input device and a method for the same, in which the steering wheel input device has gesture recognition capabilities and compensates for changes in steering wheel angle to enable recognition of gestures input by a user, even when the steering wheel angle is varied.

According to one embodiment provided herein, a steering wheel input device is mounted on a steering wheel of a vehicle and includes a pointer detection device. The pointer detection device further includes a pointer detection surface and an input detection unit. The input detection unit is configured to detect on the pointer detection surface one of a single pointer event or multiple simultaneous pointer events, any movement or breaking of the pointer event or events, and speed, velocity, and acceleration of the pointer event or events. The input detection unit then outputs a corresponding pointer detection signal. The steering wheel input device further comprises a rotation angle sensor configured to measure an angle of rotation of the steering wheel and to output at least one corresponding rotation detection signal. The steering wheel input device further includes a processor that is configured to determine the angle of rotation of the steering wheel with reference to the at least one corresponding rotation detection signal output by the rotation angle sensor, determine a gesture provided as input from a user from among a plurality of gestures that the pointer detection signal corresponds to with reference to the pointer detection signal and the angle of rotation of the steering wheel, and output a command corresponding to the gesture to a device in the vehicle.

According to a further embodiment provided herein, a method for a steering wheel input device includes detecting on a pointer detection surface of the steering wheel input device one of: a single pointer event or multiple simultaneous pointer events, any movement or breaking of the pointer event or events, and a speed, velocity, and acceleration of the pointer event or events on the pointer detection surface, and generating a corresponding pointer detection signal. The method further includes taking measurements related to an angle of rotation of the steering wheel and generating at least one corresponding rotation detection signal, determining the angle of rotation of the steering wheel with reference to the at least one corresponding rotation detection signal, determining which gesture among a plurality of gestures that the pointer detection signal corresponds to with reference to the pointer detection signal and the angle of rotation of the steering wheel, and outputting a command corresponding to the gesture to an appropriate device of the vehicle.

According to a further input provided herein, a steering wheel input device comprises a touch input detection unit having a surface configured to detect a gesture input of a driver, the gesture input comprising a movement of a finger on the surface of the touch input detection unit, the touch input detection unit providing in response to detecting the gesture input a corresponding touch detection signal, and a rotation angle sensor configured to measure an angle of rotation of the steering wheel and to output a corresponding rotation angle signal. The steering wheel input device further comprises a processor configured to receive the corresponding touch detection signal, receive the corresponding rotation angle signal, determine the gesture input provided as input from the driver based on the corresponding touch detection signal and the corresponding rotation angle signal, and output a command corresponding to the gesture provided as input to a device in the vehicle.

These and other features as well as advantages, which characterize the disclosure presented herein, will be apparent from a reading of the following detailed description and a review of the associated drawings.

DETAILED DESCRIPTION

Figure 1:
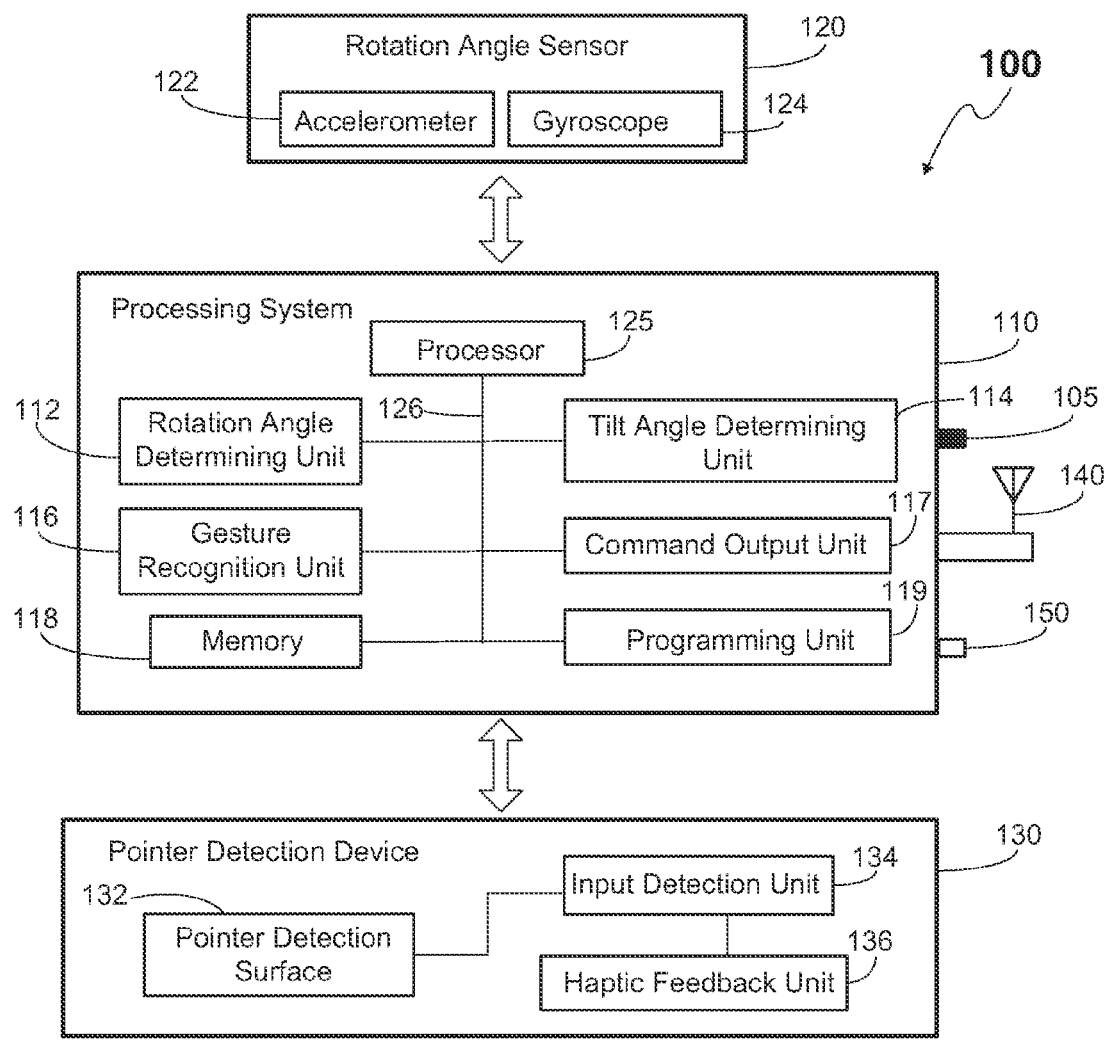
FIG. 1 is a block diagram illustration of a steering wheel input device according to an embodiment of the present disclosure.

Embodiments described herein provide a steering wheel input device having gesture recognition and steering wheel angle compensation capabilities, and a method for the steering wheel input device. In the following detailed description, references are made to the accompanying drawings that form a part thereof, and in which are shown by way of illustration specific embodiments or examples. Referring now to the drawings, in which like numerals represent like elements throughout the several figures, several illustrative implementations will be described.

Referring to FIG. 1, a block diagram illustrates a steering wheel input device according to an embodiment of the present disclosure. The steering wheel input device 100 comprises a processing system 110, a rotation angle sensor 120, and a pointer detection device 130. In certain embodiments, these units can be wired or directly connected to communicate with each other.

Figure 2:
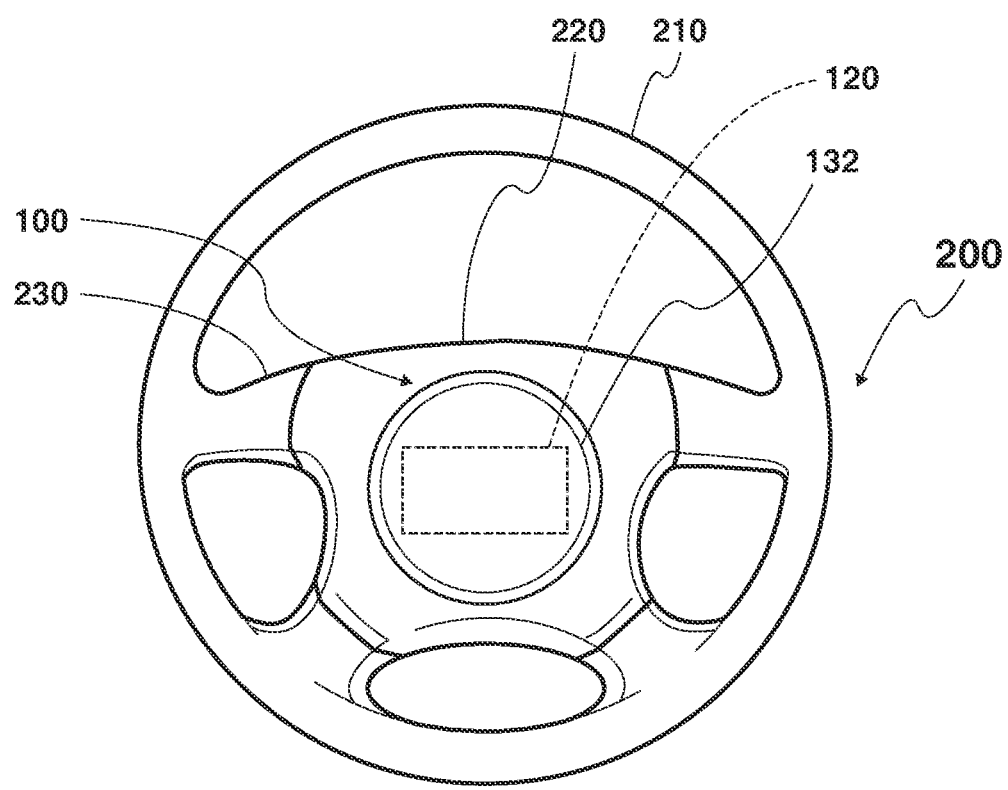
FIG. 2 is a depiction of a steering wheel and the steering wheel input device mounted to a hub of the steering wheel according to an embodiment of the present disclosure.

In one embodiment, the steering wheel input device 100 can be incorporated into a steering wheel. As shown in FIG. 2, the steering wheel input device 100 is mounted on a steering wheel 200. The steering wheel 200 includes an outer ring 210, a hub 220, and a plurality of spokes 230 interconnecting the outer ring 210 and the hub 220. In some embodiments, the steering wheel input device 100 is mounted at least partially on or in the hub 220. In some embodiments, as will be described below, the pointer detection device 130 comprises elements that are mounted on the outer ring 210 of the steering wheel 200.

Figure 3:
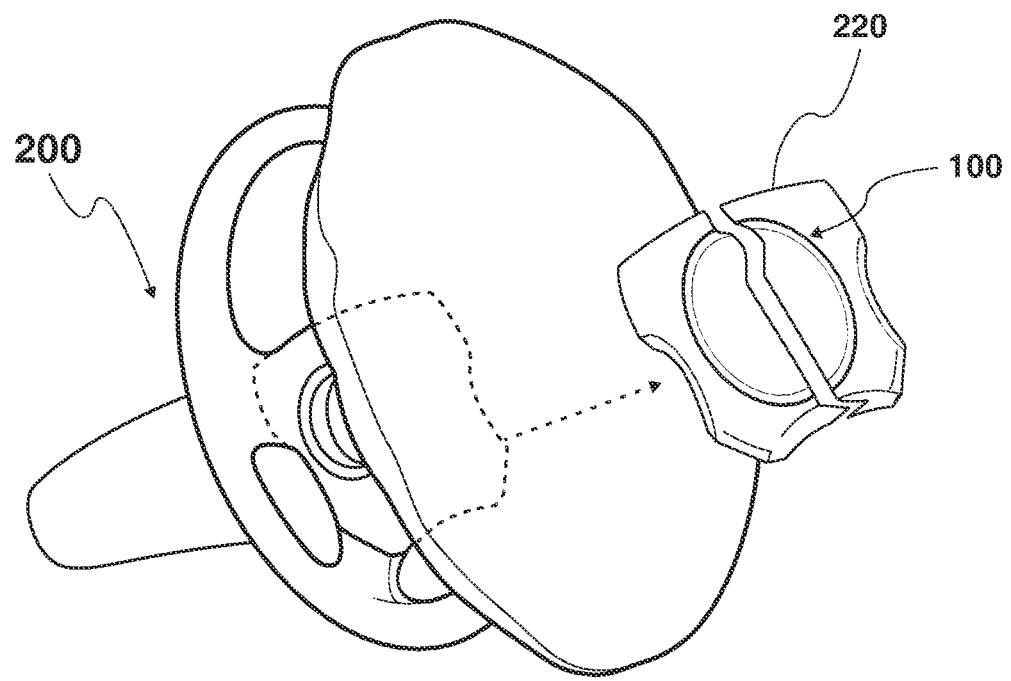
FIG. 3 is a diagram illustrating a steering wheel input device that is a thin-layered device and that ruptures when the airbag in the hub of the steering wheel deploys according to one embodiment of the present disclosure.
Figure 4:
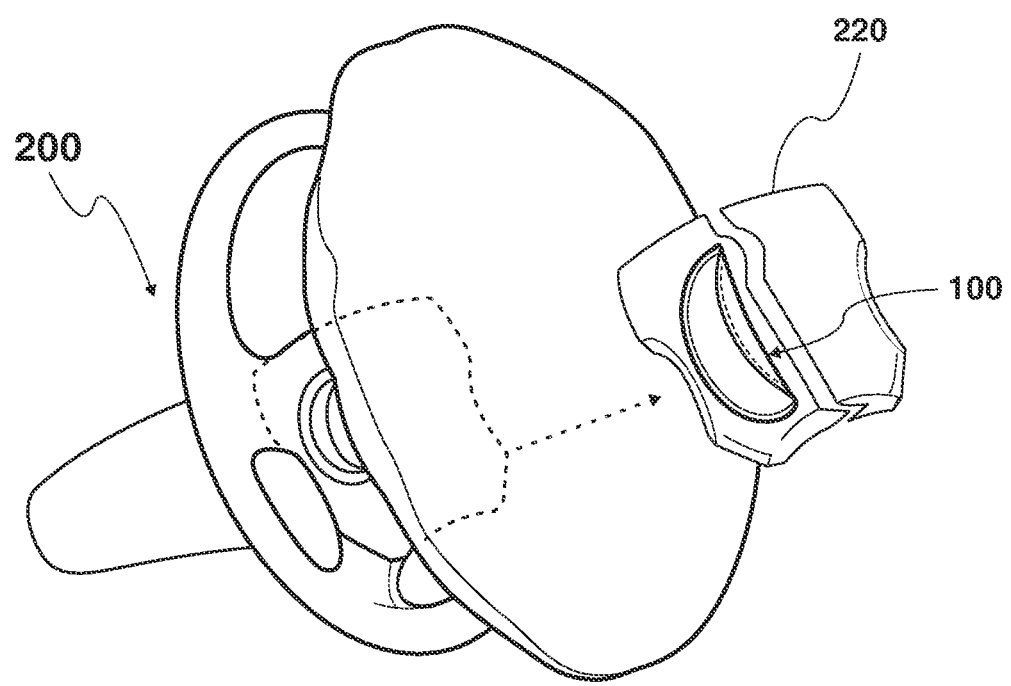
FIG. 4 is a diagram illustrating a steering wheel input device that is part of the housing of the hub and is pushed to the side when the airbag in the hub of the steering wheel deploys according to one embodiment of the present disclosure.

In some embodiments, the steering wheel input device 100 is a thin-layered device that either ruptures when an airbag (not shown) in the hub 220 of the steering wheel 200 is deployed, as shown in FIG. 3, or is part of the housing of the hub 220 that is pushed to the side when the airbag deploys, as shown in FIG. 4. For example, the hub 220 may include a cap portion (not shown) to which the steering wheel input device 100 is mounted, and the cap portion may be connected to the remainder of the hub 220 with weak sections and a strong section such that when the airbag deploys, the weak sections easily detach from the hub 220 while the strong section remains attached to the hub 220 and the cap portion essentially flaps open. In this case, the steering wheel input device 100, which is mounted to the cap portion, is displaced along with the cap portion.

Returning now to FIG. 1, the rotation angle sensor 120 takes measurements related to the angle of rotation of the steering wheel input device 100 and generates a corresponding rotation detection signal. In embodiments where the steering wheel input device 100 is mounted at least partially on or in the hub 220 of the steering wheel 200, the rotation angle sensor 120 essentially takes measurements related to the angle of rotation of the steering wheel 200. To simplify the explanation to follow, it will be assumed that the rotation angle sensor 120 is mounted on the hub 220 of the steering wheel 200, and hence, measurements related to the angle of rotation of the steering wheel input device 100 will be deemed equivalent to measurements related to the angle of rotation of the steering wheel. The rotation detection signal of the rotation angle sensor 120 is output to the processor 125.

The processing system 110 includes a processor 125 that communicates over a bus 126 to various other components. These components can be implemented as software modules, hardware modules, or a combination thereof. The processor 125 may be constructed from any number of transistors or other circuit elements, which may individually or collectively assume any number of states. More specifically, the processor 125 may operate as a state machine or finite-state machine. Such a machine may be transformed to a second machine, or a specific machine, by loading executable instructions contained within the program modules. These computer-executable instructions may transform the processor 125 by specifying how the processor 125 transitions between states, thereby transforming the transistors or other circuit elements constituting the processor 125 from a first machine to a second machine, wherein the second machine may be specifically configured to perform the operations disclosed herein. The states of either machine may also be transformed by receiving input from one or more input units, or other peripherals. Either machine may also transform states, or various physical characteristics of various output devices such as printers, speakers, video displays, or otherwise.

The processing system 110 includes a rotation angle determining unit 112. The rotation angle determining unit 112 calculates the angle of rotation of the steering wheel 200 using the rotation detection signal output by the rotation angle sensor 120.

In some embodiments, the rotation angle sensor 120 comprises an accelerometer 122 and a gyroscope 124. Each of the accelerometer 122 and the gyroscope 124 of the rotation angle sensor 120 takes measurements related to the angle of rotation of the steering wheel input device 100 and independently outputs a rotation detection signal to the processing system 110. The rotation angle determining unit 112 of the processing system 110 then combines the rotation detection signals using a predetermined formula to determine the angle of rotation of the steering wheel input device 100 (also referred to simply as "steering wheel angle").

It is noted that the accuracy of calculating the steering wheel angle based on measurements of the accelerometer 122 drops considerably when the accelerometer 122 is subjected to external noise and vibrations. In view of the fact that the steering wheel input device 100 is mounted on a steering wheel 200 of a vehicle, there will be significant external noise, which may be generated by vibrations from the vehicle and forces generated from stopping, abruptly accelerating, and turning the vehicle. Hence, by using both the accelerometer 122 and the gyroscope 124, the accuracy of calculating the steering wheel angle is increased, since the gyroscope 124 can measure the angular velocity of the steering wheel 200 only, filtering considerably the linear acceleration in any direction.

In some embodiments, the rotation angle sensor 120 is further configured to take measurements during a calibration period and to output a corresponding steering wheel tilt angle signal to the processing system 110. In such embodiments, the processing system 110 may further include a tilt angle determining unit 114. The tilt angle determining unit 114 determines the tilt angle of the steering wheel 200 using the tilt angle signal output by the rotation angle sensor 120 during the calibration period, and then outputs a corresponding tilt angle determination signal to the rotation angle determining unit 112. The rotation angle determining unit 112 subsequently calculates the angle of rotation of the steering wheel 200 using the rotation detection signal output by the rotation angle sensor 120 and the tilt angle determination signal output by the tilt angle determining unit 114. The rotation angle determining unit 112 then outputs a rotation angle signal. When the rotation angle sensor 120 includes the accelerometer 122 and the gyroscope 124, the predetermined formula used to combine the rotation detection signals from the accelerometer 122 and the gyroscope 124 to determine the angle of rotation of the steering wheel input device 100 is altered through this process (since, for example, the accelerometer 122 may operate better at some tilt angles than at others). Hence, the steering wheel input device 100 is essentially recalibrated so that calculations of the angle of rotation of the steering wheel 200 are accurate for the particular tilt angle of the steering wheel 200.

As is well known in the art, not all vehicles have the same steering wheel tilt angle. Therefore, it may be highly desirable and even necessary for the steering wheel input device 100 to undergo such recalibration, particularly when the steering wheel input device 100 is an aftermarket product. Moreover, the steering wheel tilt angle is adjustable in many vehicles, again making it necessary for the steering wheel input device 100 to have this function so that recalibration can be performed whenever the steering wheel tilt angle is changed. That is, the rotation angle sensor 120 may be calibrated during manufacture of the steering wheel input device 100 while at a particular orientation and may not operate properly or optimally if not placed in that particular orientation. Hence, when the rotation angle sensor 120 has an orientation after mounting to the steering wheel 200 that is different from the orientation used for calibration during manufacture of the steering wheel input device 100, recalibration may be desirable and even necessary.

In some embodiments, the steering wheel input device 100 includes a calibration button 105 connected to the tilt angle determining unit 114. In other embodiments, the pointer detection device 130 may be manipulated by the user to effect calibration. When the user presses the calibration button 105 (or manipulates the pointer detection device 130 to effect calibration), the tilt angle determining unit 114 of the processing system 110 controls the rotation angle sensor 120 to take measurements, after which the rotation angle sensor 120 outputs a corresponding steering wheel tilt angle signal to the tilt angle determining unit 114. The tilt angle determining unit 114 then determines the tilt angle of the steering wheel 200 using the tilt angle signal and subsequently outputs a corresponding tilt angle determination signal, as described above. Finally, the rotation angle determining unit 112 subsequently calculates the angle of rotation of the steering wheel 200 using the rotation detection signal output by the rotation angle sensor 120 and the tilt angle determination signal output by the tilt angle determining unit 114. Thereafter, the same tilt angle determination signal (i.e., the same tilt angle of the steering wheel 200) is used by the rotation angle sensor 120 until recalibration is again performed.

It may be desirable to notify the user (or vehicle manufacturer) that the steering wheel 200 must be placed in the central position prior to pressing the calibration button 105, and to leave the steering wheel 200 undisturbed during the entire calibration period. In addition, the user (or vehicle manufacturer) should be instructed to ensure that the steering wheel input device 100 is mounted in a state centered on the steering wheel 200, i.e., centered on the hub 220 of the steering wheel 200.

In some embodiments, upon depressing the calibration button 105, the tilt angle determining unit 114 may determine from the steering wheel tilt angle signal output by the rotation angle sensor 120 that the steering wheel 200 is substantially horizontal. Such an orientation is commonly found on buses. In this case, the rotation angle determining unit 112 obtains a reference direction for the gyroscope 124 immediately after calibration button 105 is depressed, and continuously updates the reference direction. The rotation angle determining unit 112 continuously updates the reference direction by determining what is forward using the accelerometer 122, taking into consideration the fact that most acceleration and deceleration are forward and backward, and that left and right turns are over time averaged out into going straight.

In some embodiments, the pointer detection device 130 comprises a pointer detection surface 132 and an input detection unit 134. In some embodiments, the pointer detection surface 132 is a touch-sensitive surface, and the input detection unit 134 detects contact on the pointer detection surface 132 (typically made by a finger of a user) and any movement or breaking thereof (i.e., the target is no longer close enough to be sensed) by using any of a plurality of touch sensing technologies, such as but not limited to capacitive, resistive, infrared, and surface acoustic wave technologies. The input detection unit 134 may also detect speed (magnitude), velocity (both magnitude and direction), and acceleration (a change in magnitude and/or direction) of the contact on the pointer detection surface 132.

In some embodiments, the pointer detection surface 132 is a proximity-sensitive surface, and the input detection unit 134 detects the presence of a target (typically a finger of a user) in proximity to the pointer detection surface 132 and any movement or breaking thereof (i.e., the target is no longer close enough to be sensed) by using any of a plurality of proximity sensing technologies, such as but not limited to inductive, capacitive, capacitive displacement, optical shadow, eddy-current, magnetic, photocell, laser rangefinder, sonar, and radar technologies. The input detection unit 134 may also detect speed, velocity, and acceleration of the target that is in proximity to the pointer detection surface 132. Furthermore, the input detection unit 134 may detect different proximities of the target to the pointer detection surface 132.

Moreover, the input detection unit 134 is able to perform such detection with respect to single contacts (or a single target in proximity to the pointer detection surface 132) performed using a single finger (or object, such as a stylus), or with respect to multiple simultaneous contacts (or targets in proximity to the pointer detection surface 132) performed using two or more fingers or objects. There are referred to as a single point event or a multiple simultaneous pointer event. The input detection unit 134 outputs a corresponding pointer detection signal to the processor 125.

It is noted that the ability by the input detection unit 134 to detect speed, velocity, and acceleration of a contact or proximity by a target is extremely important for gesture recognition. For example, a rightward drag gesture is different from a leftward drag gesture, and an upward flick gesture is different from an upward drag gesture, etc. Hence, it is essential for the input detection unit 134 to be able to detect not only contact and breaking of the contact (or presence of a target and removal of the target), but also speed, velocity, and acceleration of the contact (or target in proximity to the pointer detection surface 132). For at least this reason, gesture recognition technology is distinguished from other touch technologies, such as handwriting recognition technology.

In embodiments where the input detection unit 134 detects contact on the pointer detection surface 132, the pointer detection surface 132 is a touch-sensitive surface and may be part of a touchpad, which is not capable of displaying visual output, or may be part of a touchscreen, which is capable of displaying visual output, such as icons, instructions, a picture, etc. In embodiments where the input detection unit 134 detects the presence of a target in proximity to the pointer detection surface 132, the pointer detection surface 132 is a proximity-sensitive surface and may be part of a proximity pad, which is not capable of displaying visual output, or may be part of a proximity sensing display, which is capable of displaying visual output.

Figure 5:
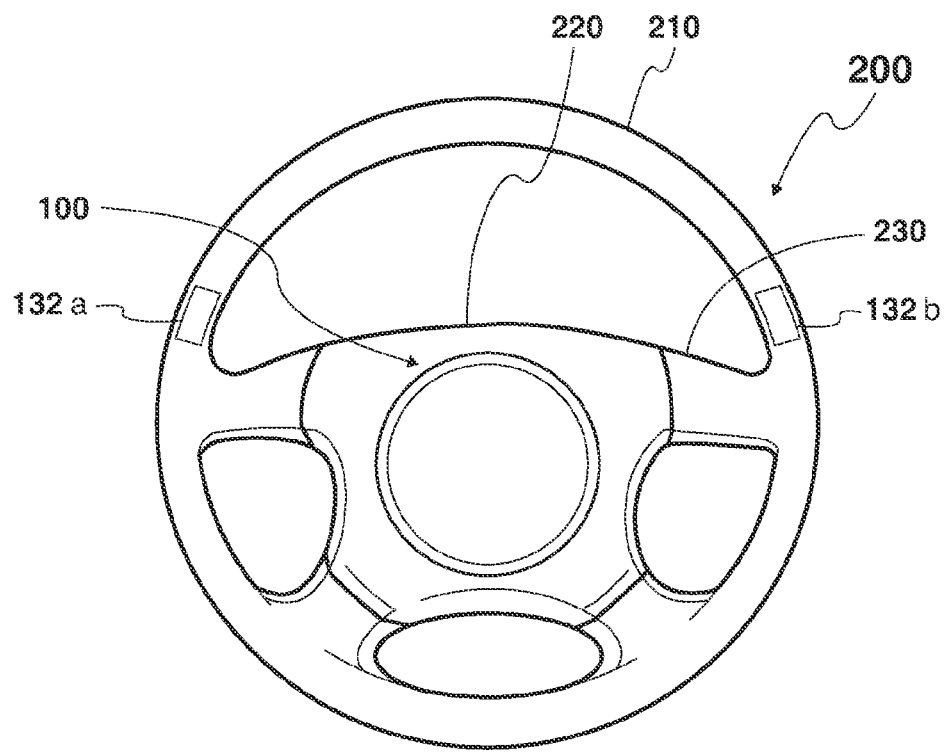
FIG. 5 is a diagram illustrating second detection surfaces positioned on an outer ring of the steering wheel according to one embodiment of the present disclosure.

In some embodiments, with reference to FIG. 5, the pointer detection surface 132 comprises a first detection surface 132*a* and a second detection surface 132*b* (collectively referred to as 132). The first detection surface 132*a* is positioned on the outer ring 210 of the steering wheel 200, and the second detection surface 132*b* is mounted on the outer ring 210 of the steering wheel 200 angularly displaced from the first detection surface 132*a*. With this positioning, the first and second detection surfaces 132*a*, 132*b*, respectively, could be operated by the thumbs of the user. This would allow for easy access to the first and second detection surfaces 132*a*, 132*b* by the user so that gestures may be input without having to remove a hand from the steering wheel 200. For example, when the input detection unit 134 detects proximities of targets to the first and second detection surfaces 132*a*, 132*b*, the user could perform swiping gestures over the first and second detection surfaces 132*a*, 132*b* with his or her thumbs easily and safely. In some embodiments, the pointer detection surface 132 includes only one of either the first detection surface 132*a* or the second detection surface 132*b*.

In some embodiments, the pointer detection device 130 further comprises a haptic feedback unit 136. The haptic feedback unit 136 provides tactile feedback to the user. For example, the haptic feedback unit 136 may provide vibration response to contact on the pointer detection surface 132. The haptic feedback unit 136 may provide such tactile feedback upon reception of the pointer detection signal from the input detection unit 134, or may be controlled by the processor 125 to provide such tactile feedback.

In some embodiments, the processing system 110 comprises a gesture recognition unit 116 and a command output unit 117. The gesture recognition unit 116 receives the pointer detection signal from the input detection unit 134 of the pointer detection device 130 and the rotation angle signal from the rotation angle determining unit 112, determines which gesture that the pointer detection signal corresponds to with reference to the pointer detection signal and the rotation angle signal, and further determines which command that the gesture corresponds to. The command is then output through the command output unit 117 to the appropriate device of the vehicle. For example, the command may correspond to a command for an audio system function, an on-board computer function, a navigation function, an entertainment system function, and/or another function.

In some embodiments, the steering wheel input device 100 includes a transmitter device 140 that allows the command to be output wirelessly to the appropriate device of the vehicle. For example, the transmitter device 140 may include a Universal Serial Bus (USB) dongle 150 connected to the command output unit 117 and through which the command is outputted by the command output unit 117 to the appropriate device of the vehicle. As an example, the USB dongle may be a USB Bluetooth® dongle. Other similar devices based on radio wave, infrared, and other technologies for wireless transmission of the command to the appropriate device of the vehicle may also be used as the transmitter device 140.

In some embodiments, the processing system 110 further comprises a memory 118, and a look-up table is stored in the memory 118. After determining which gesture that the pointer detection signal corresponds to with further reference to the rotation angle signal, the gesture recognition unit 116 may access the look-up table stored in the memory 118 to determine which command that the gesture corresponds to.

The memory 118 can be used to store programs for use by the processor 125 and can comprise in one embodiment mass storage media. In certain embodiments, the rotation angle determining unit 112, tilt angle determining unit 114, gesture recognition unit 116, command output unit 117, and programming unit 119 are implemented as programming instructions, and these program module units can be stored in memory 118. The memory 118 may also be used to store processing results of the processor 125 and/or the results of the above identified units. The memory 118 is connected to the processor 125 through using a bus 126. The memory 118 and its associated computer-readable media provide non-volatile storage for the processor 125. Although the description of computer-readable media contained herein refers to a mass storage device, such as a hard disk or CD-ROM drive, it should be appreciated by those skilled in the art that computer-readable media can be any available media that can be accessed by the system 110.

In other embodiments, the rotation angle determining unit 112, tilt angle determining unit 114, gesture recognition unit 116, command output unit 117, and programming unit 119 are implemented as dedicated hardware performing certain pre-defined operations disclosed herein and the results of these operations can be stored in memory 118.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the system 110.

As described above, the gesture recognition unit 116 receives the pointer detection signal from the input detection unit 134 of the pointer detection device 130 and the rotation angle signal from the rotation angle determining unit 112 to determine which gesture that the pointer detection signal corresponds to. Hence, the gesture recognition unit 116 combines the pointer detection signal and the rotation detection signal to thereby compensate for any angle of rotation of the steering wheel 200.

Figure 6:
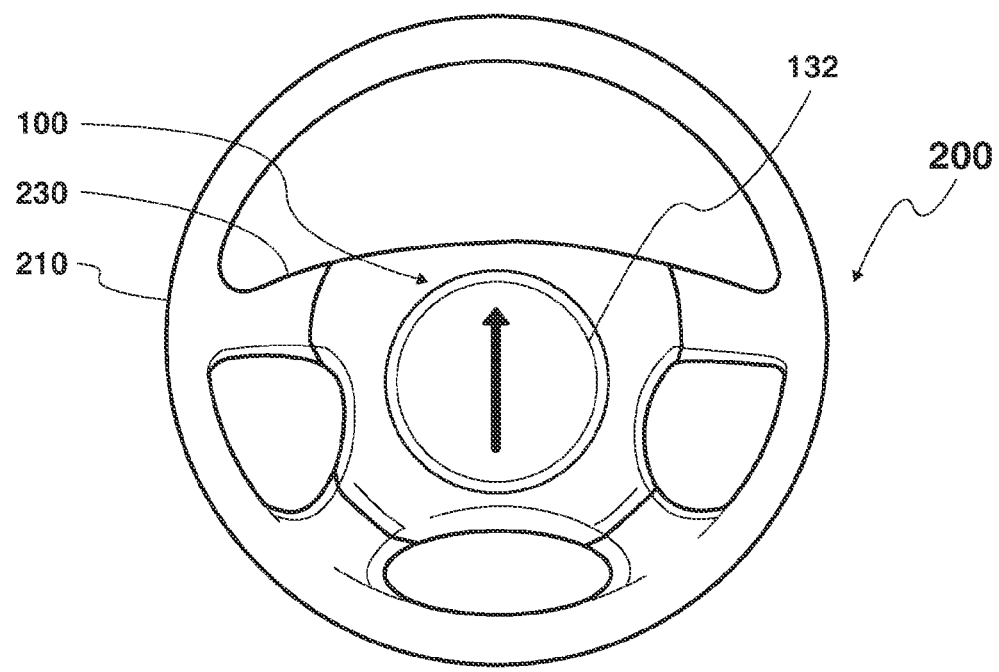
FIGS. 6-9 are diagrams illustrating the steering wheel and the steering wheel input device mounted thereon and illustrating the trace of a directly upward drag gesture drawn on a pointer detection surface of the steering wheel input device at various angles of rotation of the steering wheel according to one embodiment of the present disclosure.
Figure 7:
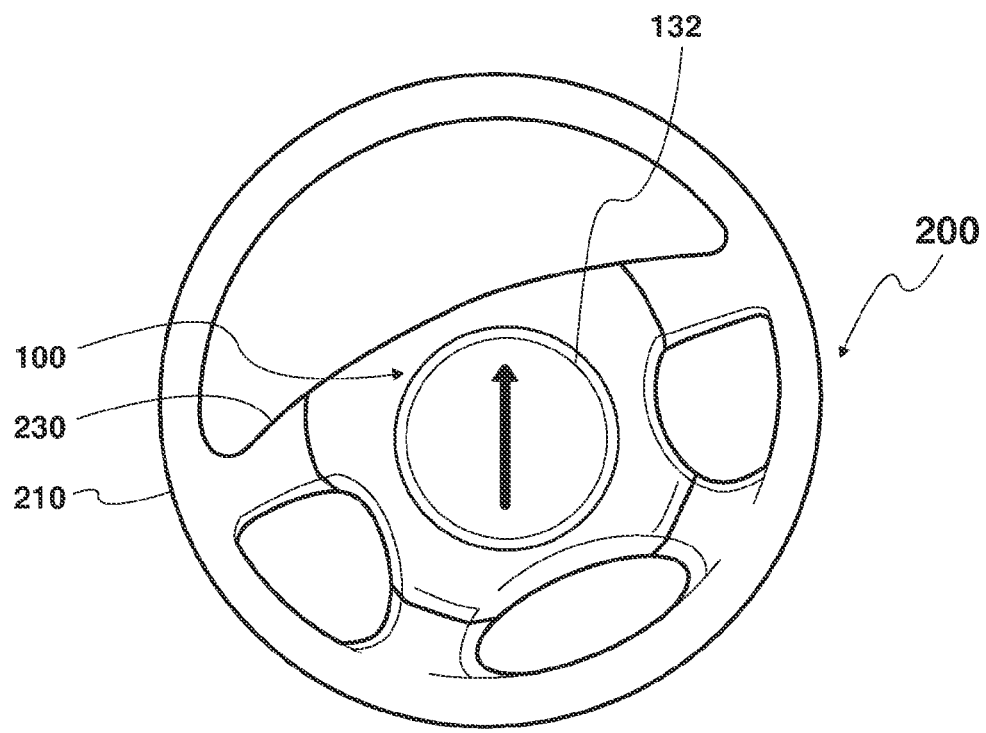
Figure 8:
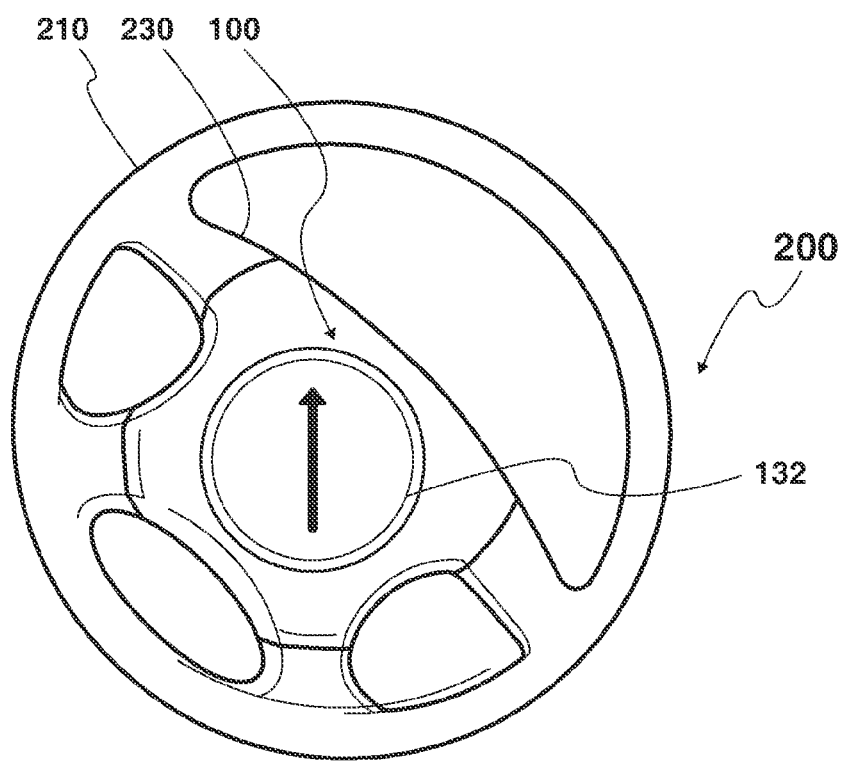
Figure 9:
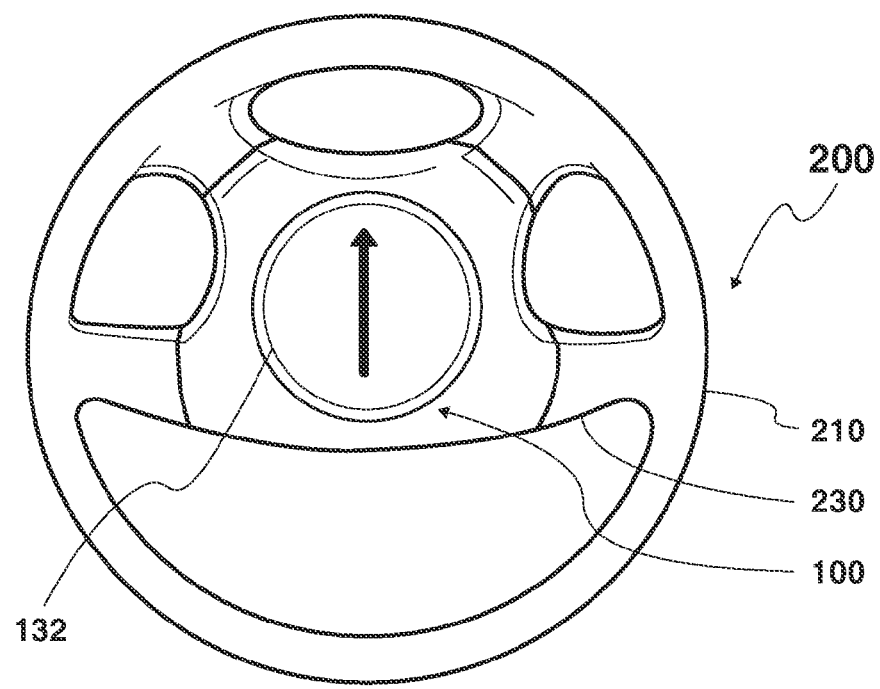

For example, let us assume that a directly upward drag gesture on the pointer detection surface 132 of the pointer detection device 130 by the user corresponds to a command given to the car stereo system to change to the next song track. Using the pointer detection signal from the pointer detection device 130 and the rotation detection signal from the rotation angle sensor 120, this directly upward drag gesture on the pointer detection surface 132 will be accurately recognized as an upward drag gesture. The gesture will therefore correspond to the command to change to the next song track by the gesture recognition unit 116 regardless of whether the steering wheel 200 has an angle of rotation of: 0 degrees (i.e., is at the center position) as shown in FIG. 6, has an angle of rotation of −23 degrees as shown in FIG. 7, has an angle of rotation of +45 degrees as shown in FIG. 8, or has an angle of rotation of ±180 degrees as shown in FIG. 9.

Figure 10:
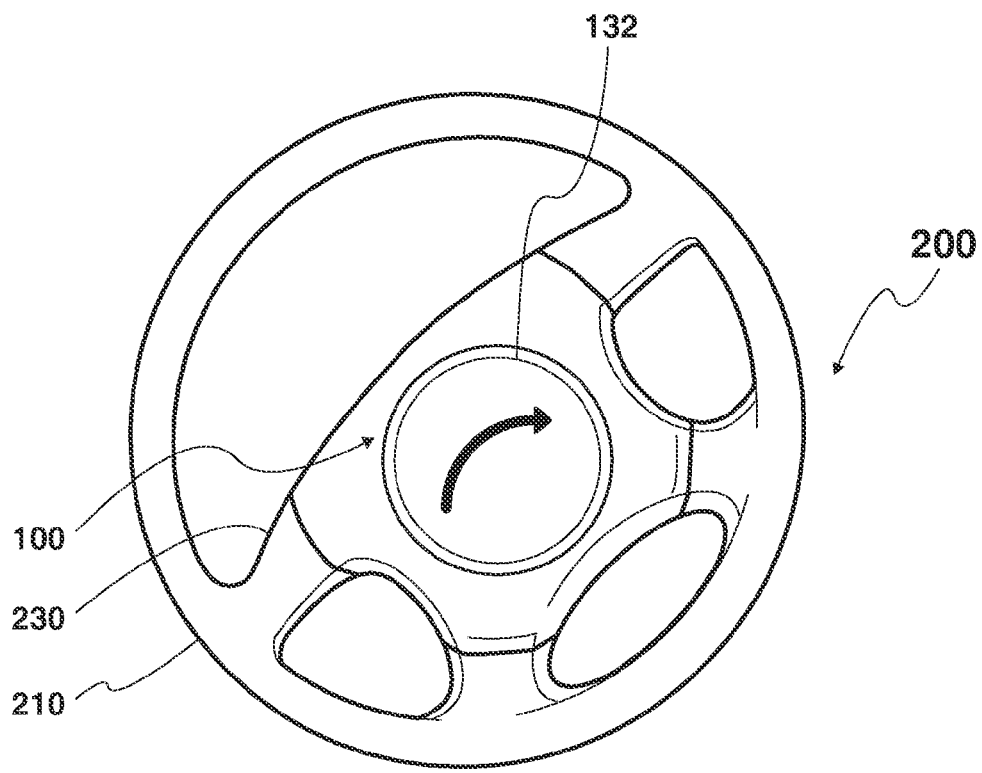
FIG. 10 is a diagram illustrating the steering wheel and the steering wheel input device mounted thereon and illustrating the trace of a directly upward drag gesture when drawn on the pointer detection surface of the steering wheel input device while the steering wheel is undergoing a change in angle of rotation corresponding to a left turn operation according to one embodiment of the present disclosure.

Moreover, the gesture recognition unit 116 of the processing system 110 is able to perform compensation even while changes in angle of rotation of the steering wheel 200 are taking place. For example, if the above-described directly upward drag gesture is input by the user during an operation of making a left turn, the touch trace formed on the pointer detection surface 132 will be as shown in FIG. 10. In this case, the gesture recognition unit 116 is able to recognize the rightward arcing drag gesture as a directly upward drag gesture by combining the pointer detection signal from the pointer detection device 130 and the rotation detection signal from the rotation angle sensor 120.

In some embodiments, the gesture recognition unit 116 performs control such that feedback information is displayed on the pointer detection surface 132 (when able to display visual output). That is, after the gesture recognition unit 116 outputs a command through the command output unit 117 to the appropriate device of the vehicle, the gesture recognition unit 116 may perform control to provide feedback to the user of the changed state of the device. For example, if the user inputs a gesture to turn on the air conditioner, after outputting a corresponding command to the climate control system of the vehicle, the gesture recognition unit 116 may perform control to output a message on the pointer detection surface 132 that the air conditioner has been turned on. In some embodiments, the gesture recognition unit 116 is linked to the various vehicle systems so that the feedback information is provided to the user only after it is verified that a change has taken place in the device to which the command has been sent.

In some embodiments, the gesture recognition unit 116 determines the inclination angle of the vehicle from the rotation detection signal output by the rotation angle sensor 120, and outputs a corresponding message on the pointer detection surface 132 of the pointer detection device 130. This may be useful information when driving on mountain roads. Truck drivers may find this information particularly useful.

In some embodiments, the user may program the steering wheel input device 100 to designate gestures and associate commands with the designated gestures. In such embodiments, the user may be setting up or altering the look-up table stored in the memory 118 of the processing system 110. In embodiments allowing for such user programming of the steering wheel input device 100, the processing system 110 comprises a programming unit 119 which facilitates programming of the steering wheel input device 100. For example, assuming that the pointer detection surface 132 is capable of displaying visual output, the programming unit 119 may control the pointer detection device 130 so that information (icons, menus, text instructions, etc.) is displayed on the pointer detection surface 132 to allow the user to designate gestures and associate commands with the designated gestures.

In some embodiments, the steering wheel input device 100 comprises a port 150, which is connected to the programming unit 119, and may be connected to an external computing device (not shown), such as a personal computer, through the port 150. The user may then program the steering wheel input device 100 in the manner described above through cooperation between the programming unit 119 and the external computing device. In some embodiments, the steering wheel input device 100 may be removed from the steering wheel 200 to facilitate such connection to an external computing device through the port 150.

Figure 11:
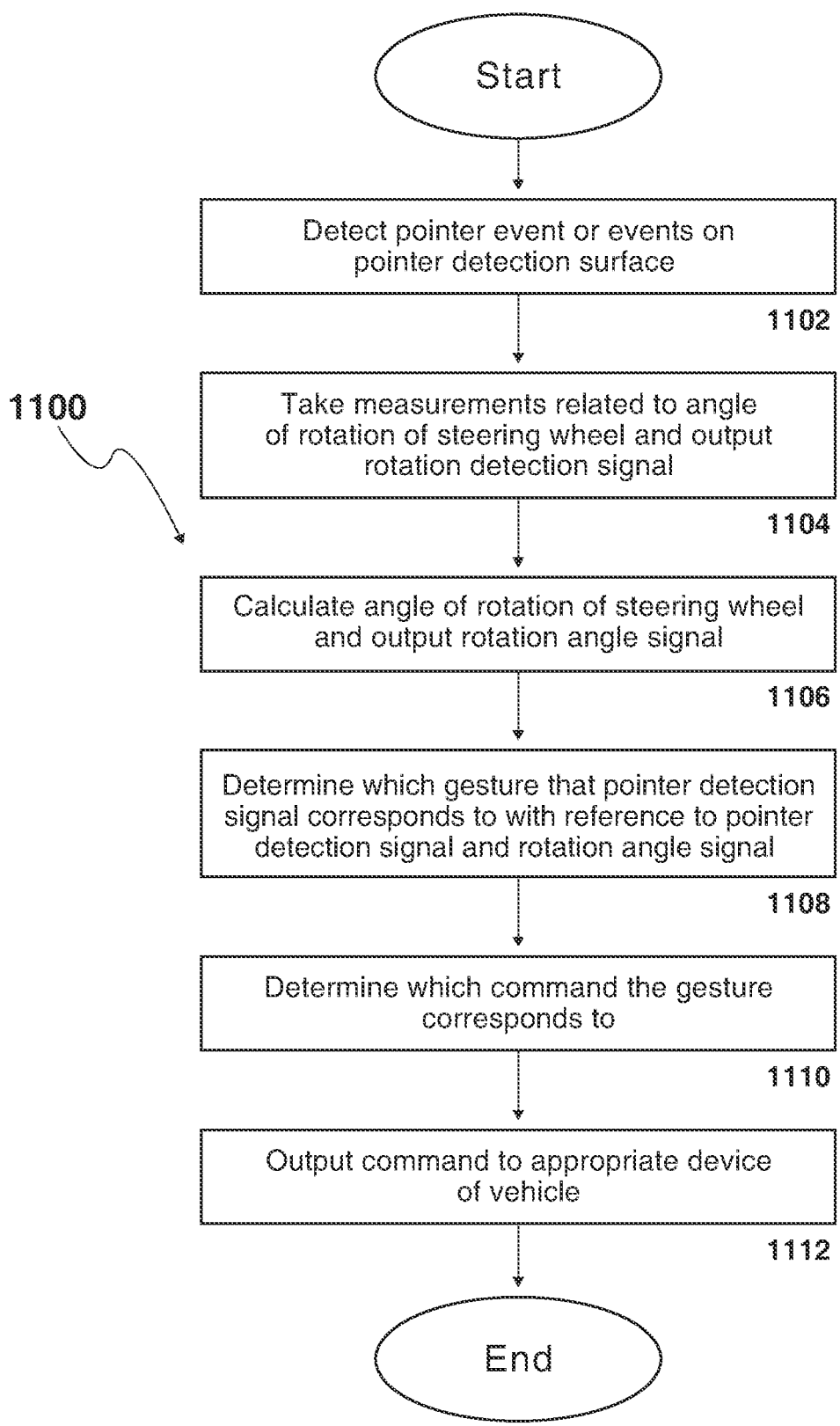
FIG. 11 is a process flow diagram illustrating a method for a steering wheel input device according to an embodiment of the present disclosure.

Referring to FIG. 11, a flow diagram will be described that illustrates a method for a steering wheel input device according to an embodiment of the present disclosure. To simplify the description to follow, both contact on the pointer detection surface 132 and presence of a target in proximity to the pointer detection surface 132 is referred to as a "pointer event."

The routine 1100 begins at operation 1102, where the input detection unit 134 of the pointer detection device 130 detects a single pointer event or multiple simultaneous pointer events on the pointer detection surface 132, any movement or breaking of the pointer event or events on the pointer detection surface 132, and speed, velocity, and acceleration of the pointer event or events on the pointer detection surface 132. The input detection unit 134 then outputs a corresponding pointer detection signal to the gesture recognition unit 116 of the processing system 110.

At operation 1104, the rotation angle sensor 120 takes measurements related to the angle of rotation of the steering wheel input device 100 (i.e., of the steering wheel 200), generates a corresponding rotation detection signal, and outputs the rotation detection signal to the rotation angle determining unit 112 of the processing system 110. As described above, in some embodiments, the rotation angle sensor 120 comprises the accelerometer 122 and the gyroscope 124, each of which outputs a rotation detection signal to the rotation angle determining unit 112 of the processing system 110.

The routine 1100 then continues to operation 1106, where the rotation angle determining unit 112 calculates the angle of rotation of the steering wheel 200 using the rotation detection signal, and outputs a corresponding rotation angle signal to the gesture recognition unit 116. The rotation angle determining unit 112 may also combine the rotation detection signals of the accelerometer 122 and the gyroscope 124 to determine the angle of rotation of the steering wheel input device 100.

From operation 1106, the routine 1100 continues to operation 1108, where the gesture recognition unit 116 determines which gesture that the pointer detection signal corresponds to with reference to the pointer detection signal and the rotation angle signal. Hence, the gesture recognition unit 116 is able to compensate for any angle of rotation of the steering wheel 200. If there is no angle of rotation of the steering wheel or a negligible amount of rotation angle of the steering wheel 200, the gesture recognition unit 116 performs no compensation.

The routine 1100 then continues to operation 1110, where the gesture recognition unit 116 determines which command that the gesture corresponds to. From operation 1110, the routine continues to operation 1112, where the gesture recognition unit 116 outputs the command through the command output unit 117 to the appropriate device of the vehicle.

As the number of gestures increases and their complexity grows, the possibility of the user inputting gestures into the pointer detection surface 132 that are difficult for the gesture recognition unit 116 to recognize increases. This is particularly true if the user is also busy with operating the vehicle while inputting gestures into the pointer detection device 130. When receiving pointer detection signals from the pointer detection device 130 that are difficult to recognize, the gesture recognition unit 116 may do one of three things: do nothing (ignore the gesture as it is indecipherable), output an error message (assuming this is possible, such as when the pointer detection surface 132 is part of a touchscreen), or make a selection between at least two possibilities.

Making a selection between at least two possibilities by the gesture recognition unit 116 can be performed in a variety of ways. For example, let us assume that a horizontal drag to the right across the pointer detection surface 132 corresponds to a command to increase the volume of the car stereo system and a horizontal flick to the right across the pointer detection surface 132 corresponds to a command to change to the next programmed, higher frequency radio station. These gestures and their corresponding commands may have been programmed by the user in the manner described above.

There may be instances when the gesture recognition unit 116 of the processing system 110 is unable to determine whether a gesture input by the user corresponds to the rightward drag gesture or the rightward flick gesture. That is, the gesture recognition unit 116 may be unable to determine which gesture that the pointer detection signal corresponds to but is able to determine that the unknown gesture is one of a predetermined number of gestures, for example, one of two gestures. In this case, the gesture recognition unit 116 may select either the rightward drag gesture or the rightward flick gesture by applying one or more predetermined rules. For example, the volume may already exceed a certain level, in which case the gesture recognition unit 116 selects the rightward flick gesture as the gesture intended by the user. The rule applied in this case is that if the volume already exceeds a certain level, a choice between the gesture corresponding to a command to increase the volume of the car stereo system and the gesture corresponding to a command to change to the next programmed, higher frequency radio station (or perhaps between the gesture corresponding to a command to increase the volume of the car stereo system and any other gesture) should result in the selection of the gesture corresponding to the command to change to the next programmed, higher frequency radio station (or the other command not related to increasing volume).

Let us further assume that a two finger double tap on the pointer detection surface 132 of the pointer detection device 130 corresponds to a command to cancel the last command, and further that the user has cancelled the last command three times immediately following three previous instances when such a selection was made by the gesture recognition unit 116 between the rightward drag gesture and the rightward flick gesture, indicating a high probability that the gesture recognition unit 116 is making incorrect selections in this case. Under such a scenario, the gesture recognition unit 116 may learn (i.e., change the particular rule applied using artificial neural network techniques) so that the next time that the same circumstances are encountered, the gesture recognition unit 116 makes a selection of the rightward drag gesture corresponding to a command to increase the volume of the car stereo system.

It is possible that the gesture recognition unit 116 made the incorrect selection under an additional set of circumstances in which there was a change in the angle of rotation of the steering wheel 200 of, for example, +40 to +45 degrees (or a change in angle of rotation of the steering wheel 200 was taking place, for example, from approximately 0 degrees to approximately +40 to +45 degrees corresponding to a right turn). The gesture recognition unit 116 may also use this information as part of "the same circumstances" under which an incorrect selection was made, and thereby learn by changing the particular rule applied so that all these conditions must be met in order to apply the newly learned rule. In other words, learning by the gesture recognition unit 116 may also be a function of the angle of rotation of the steering wheel 200.

Figure 12:
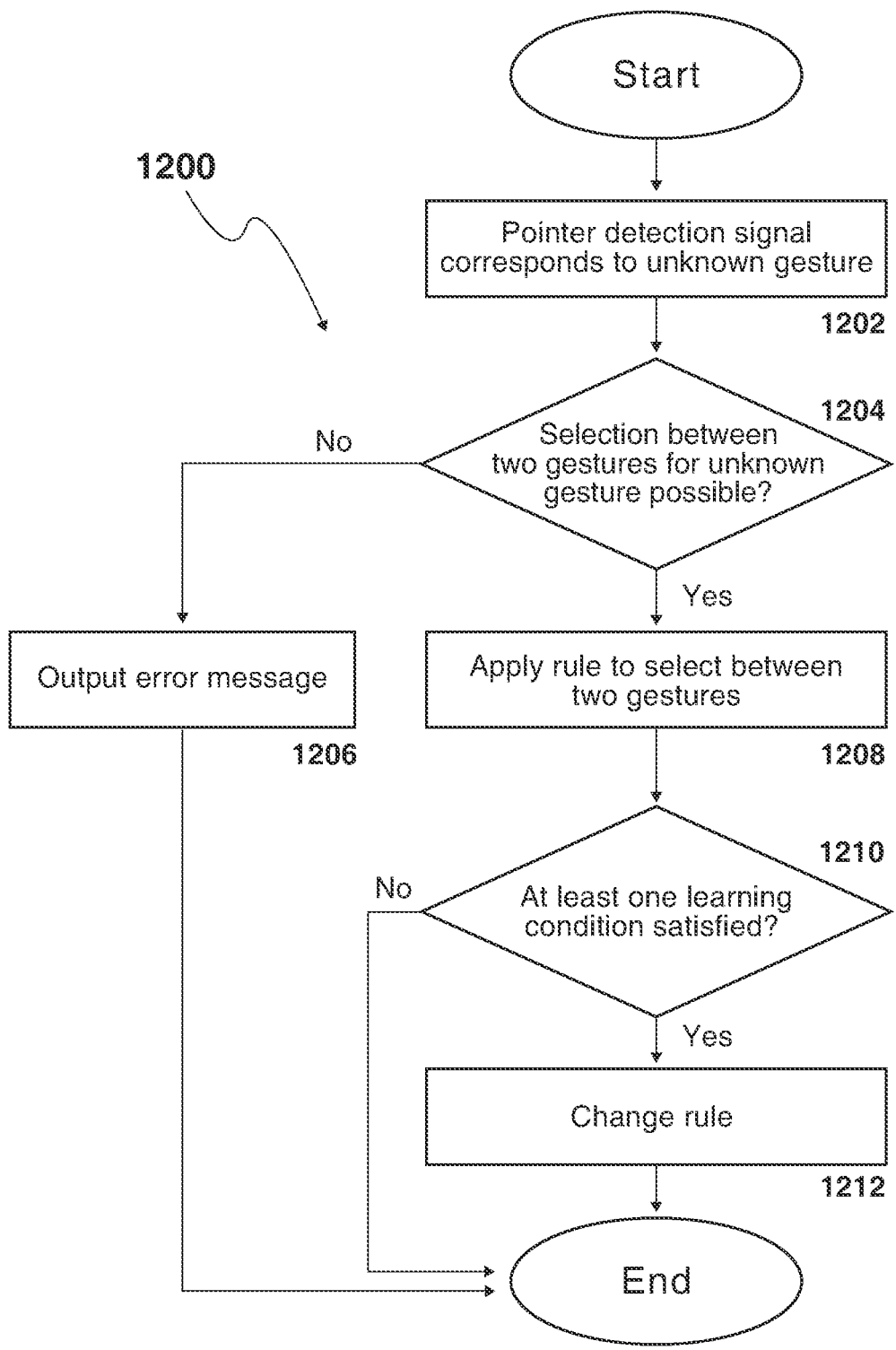
FIG. 12 is a process flow diagram illustrating a method of applying heuristics and self-learning by a processor of the steering wheel input device according to an embodiment of the present disclosure.

FIG. 12 is a flow diagram illustrating a method of applying heuristics and self-learning by a processor of the steering wheel input device according to an embodiment of the present disclosure. The routine 1200 begins at operation 1202, where the gesture recognition unit 116 determines that it is not possible to determine which gesture that the pointer detection signal corresponds to as a result of problems encountered with recognizing the pointer detection signal received from the input detection unit 134 of the pointer detection device 130. Stated differently, the gesture recognition unit 116 determines that the pointer detection signal corresponds to an unknown gesture.

The routine 1200 then continues to operation 1204, where a determination is made as to whether the gesture recognition unit 116 is able to make a selection between two gestures for the unknown gesture. If the gesture recognition unit 116 is unable to make a selection between two gestures for the unknown gesture, the routine 1200 branches to operation 1206, where the gesture recognition unit 116 performs control to output an error message. The error message may be output through the pointer detection surface 132 (when the pointer detection surface 132 is able to display visual output), or through other means, such as through the speakers of the vehicle or through the display of the on-board computer of the vehicle. It is noted that, in some embodiments, the gesture recognition unit 116 may be able to make a selection among three or more gestures, but two gestures are described in this example to simplify the explanation.

If, at operation 1204, the gesture recognition unit 116 is able to make a selection between two gestures for the unknown gesture, the routine 1200 continues to operation 1208, where the gesture recognition unit 116 applies a suitable rule to select between the two gestures as the gesture that the pointer detection signal corresponds to.

From operation 1208, the routine 1200 continues to operation 1210, where a determination is made as to whether at least one learning condition is satisfied. For example, a learning condition may be input of a gesture by the user to cancel the gesture selected by the gesture recognition unit 116. As another example, the at least one learning condition may include both input of a gesture by the user to cancel the gesture selected by the gesture recognition unit 116 and the steering wheel 200 being within a predetermined range of the same angle of rotation as during a previous instance of the user canceling the gesture when the gesture recognition unit 116 made a selection between the same two gestures.

If, at operation 1210, at least one learning condition is satisfied, the routine 1200 continues to operation 1212, where the gesture recognition unit 116 changes the rule so that the other gesture is selected the next time the same circumstances are encountered. If, at operation 1210, at least one learning condition is not satisfied, the routine 1200 ends.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A steering wheel input device mounted on a steering wheel of a vehicle, comprising:
    a pointer detection device comprising a pointer detection surface and an input detection unit, wherein the input detection unit is configured to detect on the pointer detection surface one of a single pointer event or multiple simultaneous pointer events, a movement or breaking of the pointer event, and a speed, velocity, and acceleration of the pointer event, wherein the input detection unit is configured to output in response, to a corresponding pointer detection signal;
a rotation angle sensor configured to measure an angle of rotation of the steering wheel and to output at least one corresponding rotation detection signal; and
a processor configured to
 determine the angle of rotation of the steering wheel with reference to the at least one corresponding rotation detection signal output by the rotation angle sensor,
 determine a gesture provided as input from a user from among a plurality of gestures that the pointer detection signal corresponds to with reference to the pointer detection signal and the angle of rotation of the steering wheel,
 output a command corresponding to the gesture to a device in the vehicle, and
 apply a rule to select the gesture when at least two gestures of the plurality of gestures potentially correspond to the pointer detection signal, wherein in response to at least one learning condition comprising the user inputting a second gesture to cancel the gesture selected by the processor, the processor is configured to change the rule so that a different gesture is selected in a subsequent selection between the at least two gestures of the plurality of gestures.

2. The steering wheel input device of claim 1, wherein the rotation angle sensor comprises
 an accelerometer configured to take a measurement related to the angle of rotation of the steering wheel and to output a first rotation detection signal of the at least one corresponding rotation detection signal, and the processor is configured to determine the angle of rotation of the steering wheel with reference to the first rotation detection signal of the at least one corresponding rotation detection signal.

3. The steering wheel input device of claim 2, wherein the rotation angle sensor comprises
 a gyroscope configured to take measurements related to the angle of rotation of the steering wheel and to output a second rotation detection signal of the at least one corresponding rotation detection signal, the processor being configured to determine the angle of rotation of the steering wheel with reference to the first rotation detection signal and the second rotation detection signal of the at least one corresponding rotation detection signal.

4. The steering wheel input device of claim 1, wherein the processor is programmable by the user to designate the plurality of gestures and to associate commands with the designated gestures.

5. The steering wheel input device of claim 1, wherein the at least one learning condition further comprises the steering wheel being within a predetermined range of the angle of rotation as when the processor selected the gesture using the rule prior to receiving the second gesture.

6. The steering wheel input device of claim 1, wherein:
 the pointer detection surface of the pointer detection device is part of a touchscreen or a proximity sensing display capable of displaying visual output; and
 the processor is linked to the device of the vehicle and is further configured to output information for display of a state of the device on the pointer detection surface.

7. The steering wheel input device of claim 1, wherein:
 the rotation angle sensor is further configured to take measurements related to a tilt angle of the steering wheel during a calibration period and to output a corresponding steering wheel tilt angle signal; and
 the processor is further configured to determine the tilt angle of the steering wheel using the tilt angle signal, and to determine the angle of rotation of the steering wheel with reference to the at least one rotation detection signal and further with reference to the tilt angle of the steering wheel.

8. The steering wheel input device of claim 7, further comprising a calibration button, wherein the calibration period is initiated by user manipulation of the calibration button.

9. The steering wheel input device of claim 1, wherein the pointer detection surface comprises a touch-sensitive surface, and the pointer event detected by the input detection unit is a contact on the touch-sensitive surface by a finger of the user.

10. The steering wheel input device of claim 1, wherein the pointer detection surface comprises a proximity-sensitive surface, and the pointer event detected by the input detection unit is the presence of at least one target in proximity to the proximity-sensitive surface.

11. The steering wheel input device of claim 1, wherein the pointer detection surface is mounted on an outer ring of the steering wheel, and comprises a first detection surface and a second detection surface, the first detection surface being angularly displaced from the second detection surface on the outer ring of the steering wheel.

12. The steering wheel input device of claim 1, wherein:
 the rotation angle sensor is configured to take measurements related to a changing angle of rotation of the steering wheel and to output a corresponding changing rotation detection signal; and
 the processor is configured to determine the changing angle of rotation of the steering wheel with reference to the changing rotation detection signal, and to determine the gesture among the plurality of gestures that the pointer detection signal corresponds to with reference to the pointer detection signal and the changing angle of rotation of the steering wheel.

13. A method for operating a steering wheel input device, comprising:
 detecting on a pointer detection surface of the steering wheel input device one of
  a single pointer event or multiple simultaneous pointer events,
  a movement or breaking of the pointer event on the pointer detection surface, and
  a speed, velocity, and acceleration of the single pointer event or multiple simultaneous pointer events on the pointer detection surface,
  and generating in response thereto a corresponding pointer detection signal;
 taking measurements related to an angle of rotation of the steering wheel and generating at least one corresponding rotation detection signal;
 determining the angle of rotation of the steering wheel with reference to the at least one corresponding rotation detection signal;
 determining a gesture among a plurality of gestures that the pointer detection signal corresponds to with reference to the pointer detection signal and the angle of rotation of the steering wheel;
 outputting a command corresponding to the gesture to an appropriate device of the vehicle,
 applying a rule to select the gesture when at least two gestures of the plurality of gestures potentially correspond to the pointer detection signal, and in response to a learning condition comprising the user inputting a second gesture to cancel the gesture, changing the rule so that a different gesture is selected in a subsequent selection between the at least two gestures of the plurality of gestures.

14. The method of claim 13, wherein the at least one corresponding rotation detection signal comprises a first rotation detection signal generated by an accelerometer and a second rotation detection signal generated by a gyroscope, and the angle of rotation of the steering wheel is determined with reference to the first rotation detection signal and the second rotation detection signal.

15. The method of claim 13, wherein the command is wirelessly output to the appropriate device of the vehicle through a wireless transmitter device.

16. The method of claim 13, wherein the at least one learning condition further comprises the steering wheel being within a predetermined range of the angle of rotation when the processor selects between the two gestures using the rule prior to receiving the second gesture.

17. The method of claim 13, further comprising:
taking measurements related to a tilt angle of the steering wheel during a calibration period and generating a corresponding steering wheel tilt angle signal; and
determining the tilt angle of the steering wheel using the tilt angle signal,
wherein the angle of rotation of the steering wheel is determined with reference to the at least one rotation detection signal and further with reference to the tilt angle of the steering wheel.

18. The method of claim 13, further comprising:
taking measurements related to a changing angle of rotation of the steering wheel and generating a corresponding changing rotation detection signal;
determining the changing angle of rotation of the steering wheel with reference to the changing rotation detection signal; and
determining the gesture among the plurality of gestures that the pointer detection signal corresponds to with reference to the pointer detection signal and the changing angle of rotation of the steering wheel.

19. A steering wheel input device of a vehicle comprising:
a touch input detection unit having a surface configured to detect a gesture input of a driver, the gesture input comprising a movement of a finger of the driver on the surface of the touch input detection unit and a speed, velocity, and acceleration of the finger on the surface of the touch input detection unit, the touch input detection unit providing in response to detecting the gesture input a corresponding touch detection signal;
a rotation angle sensor configured to measure an angle of rotation of a steering wheel and to output a corresponding rotation angle signal; and
a processor configured to
receive the corresponding touch detection signal,
receive the corresponding rotation angle signal,
determine the gesture input provided as input from the driver based on the corresponding touch detection signal and the corresponding rotation angle signal,
output a command corresponding to the gesture input to a device in the vehicle, and
apply a rule to select the gesture input when at least two gestures potentially correspond to a pointer detection signal, wherein in response to at least one learning condition comprising a second gesture input to cancel the gesture input determined by the processor, the processor is configured to change the rule so that a different gesture input is selected in a subsequent selection between the at least two gestures.

20. The steering wheel input device of claim 19, wherein the gesture input is an audio control indication and the device is an audio system in the vehicle.

21. The steering wheel input device of claim 20, wherein the gesture input is to increase the volume of the audio system.

22. The steering wheel input device of claim 21, wherein the touch input detection unit having a surface is positioned in a center area of the steering wheel.

* * * * *